US012606415B2

(12) United States Patent
Zhang et al.

(10) Patent No.: US 12,606,415 B2
(45) Date of Patent: Apr. 21, 2026

(54) CONTROL FOR INTERACTIVE SAFETY BETWEEN ELEVATOR SYSTEM AND MACHINE PASSENGER

(71) Applicant: Otis Elevator Company, Farmington, CT (US)

(72) Inventors: Yu Zhang, Shanghai (CN); Shenhong Wang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1562 days.

(21) Appl. No.: 17/095,463

(22) Filed: Nov. 11, 2020

(65) Prior Publication Data

US 2021/0284489 A1 Sep. 16, 2021

(30) Foreign Application Priority Data

Mar. 16, 2020 (CN) ........................ 202010181029.X

(51) Int. Cl.
*B66B 1/34* (2006.01)
*B66B 1/28* (2006.01)
*B66B 5/00* (2006.01)

(52) U.S. Cl.
CPC .............. *B66B 1/3453* (2013.01); *B66B 1/28* (2013.01); *B66B 1/3461* (2013.01);
(Continued)

(58) Field of Classification Search
CPC ....... B66B 1/3453; B66B 1/28; B66B 1/3461; B66B 5/0012; B66B 5/0025;
(Continued)

(56) References Cited

U.S. PATENT DOCUMENTS 6,707,374 B1 * 3/2004 Zaharia .................... B66B 1/468 340/5.31
8,886,390 B2 * 11/2014 Wolfe .............. G05B 19/41895 701/1
(Continued)

FOREIGN PATENT DOCUMENTS

CN 108163653 A * 6/2018 ........... B66B 1/3415
CN 109573754 A 4/2019
(Continued)

OTHER PUBLICATIONS

Chinese Office Action for Application No. 202010181029.X, Issued Feb. 21, 2024, 5 Pages.
(Continued)

*Primary Examiner* — Bickey Dhakal
(74) *Attorney, Agent, or Firm* — CANTOR COLBURN LLP

(57) ABSTRACT

An interaction safety control between an elevator system and a machine passenger. An interaction safety control method between an elevator system and a machine passenger, which includes: receiving a command from the machine passenger; based on a received command, determining the safety of the command with respect to the elevator system; and in case that the command is determined to be unsafe with respect to the elevator system, not sending the command to an elevator control device of the elevator system.

28 Claims, 8 Drawing Sheets

(52) U.S. Cl.
CPC .......... *B66B 5/0012* (2013.01); *B66B 5/0025* (2013.01); *B66B 5/0031* (2013.01); *B66B 2201/401* (2013.01); *B66B 2201/405* (2013.01)

(58) Field of Classification Search
CPC ............ B66B 5/0031; B66B 2201/401; B66B 2201/405; B66B 2201/104; B66B 1/2408; B66B 1/3423; B66B 1/3446; B66B 1/468; B66B 201/4684; B66B 201/4653
See application file for complete search history.

(56) References Cited

U.S. PATENT DOCUMENTS

| | | | | |
|---|---|---|---|---|
| 2012/0041593 | A1 | 2/2012 | Ichinose et al. | |
| 2019/0193989 | A1* | 6/2019 | Huang | B66B 1/468 |

FOREIGN PATENT DOCUMENTS

| | | | |
|---|---|---|---|
| CN | 109969878 | A | 7/2019 |
| CN | 110861094 | A | 3/2020 |
| EP | 3450371 | A1 | 3/2019 |
| JP | 6552755 | B1 | 7/2019 |

OTHER PUBLICATIONS

European Search Report for Application No. 20215781.4; Issued Aug. 16, 2021; 7 Pages.

* cited by examiner

CONTROL FOR INTERACTIVE SAFETY BETWEEN ELEVATOR SYSTEM AND MACHINE PASSENGER

CROSS-REFERENCE TO RELATED APPLICATION

This application claims priority from Chinese patent application No. 202010181029, filed on Mar. 16, 2020, the entirety of which is hereby incorporated by reference herein and forms a part of the specification.

FIELD OF THE INVENTION

The invention belongs to the technical field of Elevators, relates to the interaction safety between an elevator system and a machine passenger, and specifically relates to an interaction safety control method between an elevator system and a machine passenger, a readable storage medium, a computer device and an elevator system using the computer device.

BACKGROUND OF THE INVENTION

With the development of intelligent robot technology, more and more intelligent robots come into buildings to provide services for people, e.g., providing item shipping services in hotels, office buildings. Thus, there is a situation where the robot is a passenger of an elevator system in a building, i.e., with respect to an elevator system, a robot may take an elevator as a machine passenger, and may even wirelessly interact with the elevator system to send various commands, e.g. issuing commands for requesting to register a destination floor within an elevator car, issuing commands for requesting a call at a landing hall, and so on.

SUMMARY OF THE INVENTION

According to a first aspect of the present invention, there is provided an interaction safety control method between an elevator system and a machine passenger, comprising: receiving a command from the machine passenger; based on a received command, determining the safety of the command with respect to the elevator system; and in case that the command is determined to be unsafe with respect to the elevator system, not sending the command to an elevator control device of the elevator system.

The interaction safety control method according to an embodiment of the invention, wherein information of the command comprises a command type; the steps of determining the safety of the command with respect to the elevator system comprise: based on the command type of the command, judging whether a currently received command belongs to the command type corresponding to a safe sub-interface which is pre-opened to the machine passenger; and determining that the currently received command is unsafe with respect to the elevator system in case that the currently received command does not belong to the command type corresponding to any of the safe sub-interfaces.

The interaction safety control method according to another embodiment or any of the above embodiments of the present invention, wherein the safe sub-interface that is pre-opened to the machine passenger is selected from one or more of the following: a first safe sub-interface that corresponds to the command type of requesting to register a destination floor; a second safe sub-interface that corresponds to the command type of requesting an elevator state.

The interaction safety control method according to another embodiment or any of the above embodiments of the present invention, wherein the safe sub-interface that is pre-opened to the machine passenger is further selected from one or more of the following: a third safe sub-interface that corresponds to the command type of requesting a call; a fourth safe sub-interface that corresponds to the command type of requesting to keep a car door open; a fifth safe sub-interface that corresponds to the command type of requesting to release the car door; a sixth safe sub-interface that corresponds to the command type of state polling.

The interaction safety control method according to another embodiment or any of the above embodiments of the present invention, wherein information of the command comprises an identifier of the machine passenger sending the command, and a command type; the steps of determining the safety of the command with respect to the elevator system comprise: based on the received command, judging whether it is a command that is valid with respect to the elevator system but invalid with respect to the machine passenger; if the received command is a command that is valid with respect to the elevator system but invalid with respect to the machine passenger, determining that the received command is unsafe with respect to the elevator system.

The interaction safety control method according to another embodiment or any of the above embodiments of the present invention, wherein the command that is invalid with respect to the machine passenger is predefined.

The interaction safety control method according to another embodiment or any of the above embodiments of the present invention, wherein information of the command comprises a command type, an identifier of the machine passenger sending the command, and a receipt time; the steps of determining the safety of the command with respect to the elevator system comprise: based on the receipt time of commands from a same machine passenger, determining adjacent receipt time intervals of the commands of a same command type from the same machine passenger; and based on a determined adjacent receipt time interval, determining the safety of the command with respect to the elevator system.

The interaction safety control method according to another embodiment or any of the above embodiments of the present invention, wherein in the process of determining the safety of the command with respect to the elevator system, if the adjacent receipt time interval of the currently received commands is smaller than a safe time interval corresponding to the command type of the command, determining that the currently received command is unsafe with respect to the elevator system.

The interaction safety control method according to another embodiment or any of the above embodiments of the present invention, wherein the safe time interval is preset respectively according to a minimum time required by the commands of a respective command type to be normally executed once by the elevator system.

The interaction safety control method according to another embodiment or any of the above embodiments of the present invention, wherein information of the command comprises a command type; the steps of determining the safety of the command with respect to the elevator system comprise: based on the received command and the command type thereof and current running state information of the elevator system, determining the safety of the received command with respect to the elevator system.

The interaction safety control method according to another embodiment or any of the above embodiments of the present invention, wherein in the process of determining the safety of the received command with respect to the elevator system, if switching from the current running state of the elevator system to the running state to be entered required by the command is not allowed by the elevator system, determining that the currently received command is unsafe with respect to the elevator system.

The interaction safety control method according to another embodiment or any of the above embodiments of the present invention, wherein information of the command comprises a command type, an identifier of the machine passenger sending the command, and a receipt time; the steps of determining the safety of the command with respect to the elevator system comprise: if a first command and a second command received in sequence from a same machine passenger have different command types and the first command has been sent to the elevator control device, judging whether command permutations and combinations containing the first command and the second command conform to control logic of the elevator system for the same passenger; if the command permutations and combinations do not conform to the control logic, determining that a received second command is unsafe with respect to the elevator system.

The interaction safety control method according to another embodiment or any of the above embodiments of the present invention, wherein in the process of determining the safety of the command with respect to the elevator system: according to the receipt time of a currently received second command, determining a predetermined time period by subtracting a respective predetermined time period from the receipt time, wherein the predetermined time period is related to the command type of the second command; determining the first command from the same machine passenger contained within the predetermined time period which has been received and sent to the elevator control device, and forming the command permutations and combinations that contain the first command and the second command formed in a sequential order of the receipt time.

The interaction safety control method according to another embodiment or any of the above embodiments of the present invention, wherein information of the command comprises a command type; the steps of determining the safety of the command with respect to the elevator comprise: based on the received command and the command type thereof, judging whether a wrong parameter value of a respective command type is contained in the command; and if the received command contains the wrong parameter value, determining that the currently received command is unsafe with respect to the elevator system.

The interaction safety control method according to another embodiment or any of the above embodiments of the present invention, wherein further comprising the steps of: acquiring a respective elevator run result corresponding to one or more commands that have been sent to the elevator control device; if the elevator run result includes a run exception and the run exception is not caused by the elevator system itself, determining that the one command is unsafe with respect to the elevator system, or command permutations and combinations of a plurality of commands do not conform to a control logic of the elevator system.

The interaction safety control method according to another embodiment or any of the above embodiments of the present invention, wherein the run exception includes one or more of: a persistent opening time of a car door/landing door being longer than or equal to a respective predetermined value; an opening/closing frequency of the car door/landing door being greater than or equal to a respective predetermined value; a persistent travelling time of the car being shorter than or equal to a respective predetermined value; the persistent travelling time of the car being longer than or equal to a respective predetermined value; the elevator control device having a logical error.

The interaction safety control method according to another embodiment or any of the above embodiments of the present invention, wherein further comprising the steps of: storing the commands that have been determined to be unsafe with respect to the elevator system or the command permutations and combinations that have been determined not to conform to the control logic of the elevator system; based on the commands and/or the command permutations and combinations being stored, determining the safety of subsequently received commands with respect to the elevator system.

The interaction safety control method according to another embodiment or any of the above embodiments of the present invention, wherein further comprising the steps of: judging whether the machine passenger is in an abnormal running state; and determining that the command from the machine passenger in the abnormal running state is unsafe with respect to the elevator system.

The interaction safety control method according to another embodiment or any of the above embodiments of the present invention, wherein in the process of judging whether the machine passenger is in the abnormal running state; acquiring respective elevator run results corresponding to one or more commands from a certain machine passenger which have been sent to the elevator control device; if the elevator run result includes a run exception, judging whether a same run exception occurring multiple times is associated with the command sent by a same machine passenger; if it is judged as "YES", determining that the machine passenger is in the abnormal running state.

The interaction safety control method according to another embodiment or any of the above embodiments of the present invention, wherein in the process of judging whether the machine passenger is in the abnormal running state; if the elevator run result includes the run exception, issuing a first prompt information.

The interaction safety control method according to another embodiment or any of the above embodiments of the present invention, wherein in the process of judging whether the machine passenger is in the abnormal running state; statistically analyzing which machine passengers the commands that are unsafe with respect to the elevator system are from; based on statistical information about the machine passengers obtained by statistical analysis, determining which machine passengers are in the abnormal running state.

The interaction safety control method according to another embodiment or any of the above embodiments of the present invention, wherein the steps of judging whether the machine passenger is in the abnormal running state comprises: wirelessly sending state polling information to the machine passenger; judging whether a response command for the state polling information fed back from the machine passenger is received; and if the response command is not received, determining that a respective machine passenger is in the abnormal running state.

The interaction safety control method according to another embodiment or any of the above embodiments of the present invention, wherein the state polling information is sent to the machine passenger periodically and in case that the machine passenger is in a normal running state, the response command can be received periodically from the machine passenger.

The interaction safety control method according to another embodiment or any of the above embodiments of the present invention, wherein the steps of judging whether the machine passenger is in the abnormal running state comprises: if state representation information actively sent from the machine passenger for representing that its state is abnormal is received, determining that the machine passenger is in the abnormal running state.

The interaction safety control method according to another embodiment or any of the above embodiments of the present invention, wherein further comprising the steps of: sending, to a maintenance management system, a second prompt information at least representing that a respective machine passenger is in the abnormal running state.

According to a second aspect of the invention, there is provided a computer device comprising a memory, a processor, and a computer program stored on the memory and executable on the processor, wherein the processor, when running the program, implementing the steps of any of the above interaction safety control methods.

According to a third aspect of the invention, there is provided a computer readable storage medium having stored thereon a computer program, wherein the program is executable by a processor to implement the steps of any of the above interaction safety control methods.

According to a fourth aspect of the present invention, there is provided an elevator system comprising one or more elevator cars, an elevator control device for controlling the one or more elevator cars to travel; and further comprising a safe interaction control unit configured in the above described computer device; wherein the elevator control device wirelessly interacts with one or more machine passengers to acquire commands from the machine passenger via the computer device described above, and the elevator control device controls, through the safe interaction control unit, interaction safety between the elevator system and the machine passenger.

The elevator system according to an embodiment of the invention, wherein the computer device is independently external to the elevator control device and is in communication with the elevator control device.

The above features and operations of the present invention will become more apparent from the following description and the accompanying drawings.

BRIEF DESCRIPTION OF THE DRAWINGS

The above and other objects and advantages of the present invention will become more complete and apparent from the following detailed description taken in conjunction with the drawings, wherein like or similar elements are designated by like numerals.

DETAILED DESCRIPTION OF THE EMBODIMENT(S) OF THE INVENTION

The present invention will now be described more fully with reference to the accompanying drawings, in which exemplary embodiments of the invention are shown. This invention may, however, be implemented in many different forms and should not be construed as limited to the embodiments set forth herein. Rather, these embodiments are provided so that this disclosure become thorough and complete, and will fully convey the concept of the invention to those skilled in the art.

Although features of the present invention are disclosed in connection with several embodiments/only one of embodiments, as may be desired and/or advantageous for any given or identifiable function, this feature may be combined with other embodiments/one or more other features of embodiments.

Some block diagrams shown in the figures are functional entities and do not necessarily have to correspond to physically or logically separate entities. These functional entities may be implemented in software or in one or more hardware modules or integrated circuits, or in different processing apparatus and/or microcontroller apparatus.

The machine passenger in the following embodiments of the present invention may be various types of movable machine bodies that may be associated with an elevator system, which may specifically be a robot that may take an elevator, for example, a robot for take-out, a robot for meal delivering, a robot for expressage, etc., the machine passenger may also be a transportation vehicle that autonomously moves under control. It will be understood that the specific type, structure, and/or use of a machine passenger may be varied widely, which is not limited by the following embodiments of the present invention.

Figure 1:
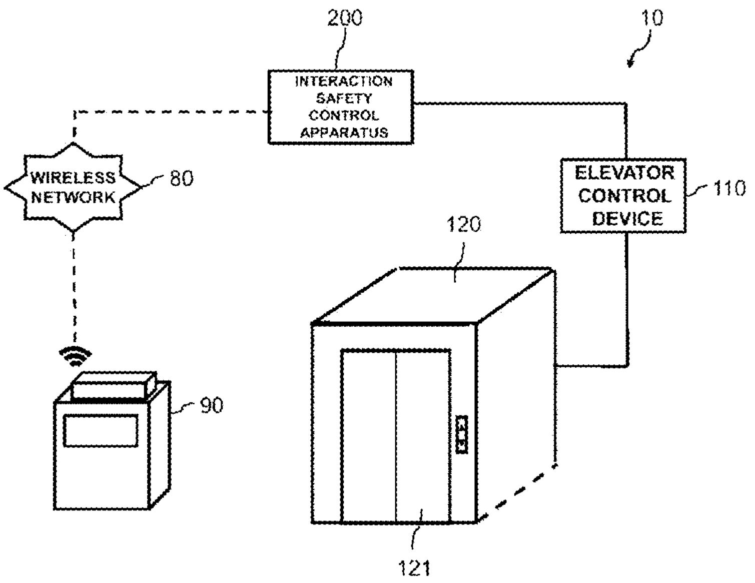
FIG. 1 is a schematic diagram of an elevator system according to an embodiment of the present invention, wherein an elevator system wirelessly interacting with one or more machine passengers using an interaction safety control apparatus of an embodiment of the present invention is illustrated.
Figure 2:
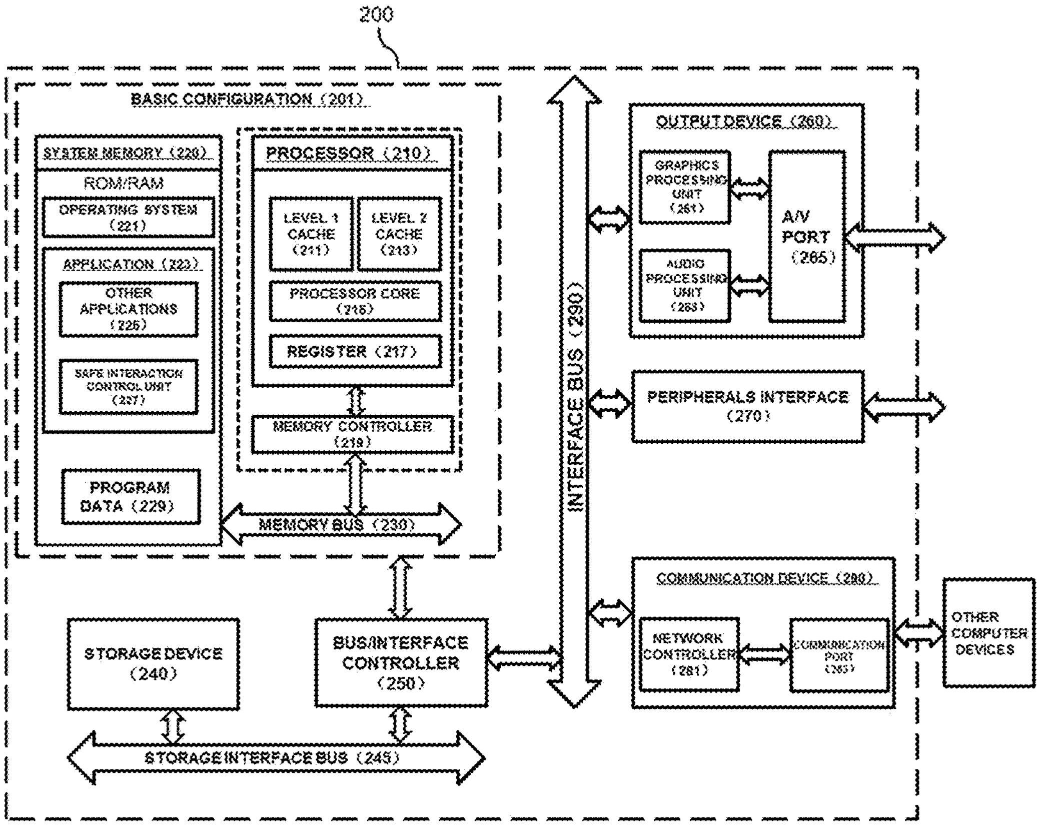
FIG. 2 is a schematic diagram of a basic structure of an interaction safety control apparatus or computer device according to an embodiment of the present invention.
Figure 3:
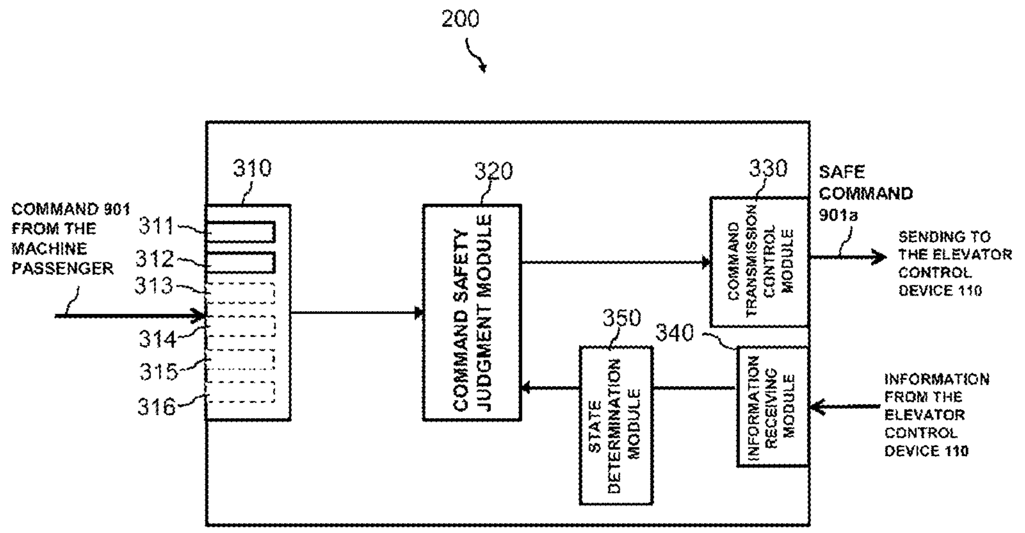
FIG. 3 is a schematic diagram of a module structure of an interaction safety control apparatus according to an embodiment of the present invention.

Shown in FIG. 1 is a schematic diagram of an elevator system according to an embodiment of the present invention, which illustrates an elevator system wirelessly interacting with one or more machine passengers using an interaction safety control apparatus of an embodiment of the present invention is illustrated; shown in FIG. 2 is a schematic diagram of a basic structure of an interaction safety control apparatus or computer device according to an embodiment of the present invention; shown in FIG. 3 is a schematic diagram of a module structure of an interaction safety control apparatus according to an embodiment of the present invention.

As shown in FIG. 1, the elevator system 10 of the present invention includes one or more elevator cars 120, and an elevator control device 110, which may be implemented by, for example, an elevator control cabinet, a group controller, or the like, which may be used to control one or more elevator cars 120 to travel in the hoistway. The specific implementation of the elevator control device 110 is not limiting.

It will be understood that the elevator system 10 may also include other conventional components not shown in the figures, e.g. traction apparatus, counterweight, and the like.

Continuing as shown in FIG. 1, the elevator system 10 wirelessly interacts with one or more machine passengers 90 using the interaction safety control apparatus 200 of an embodiment of the present invention. When the machine passenger 90 needs to take a certain elevator car 120 of the elevator system 10 to a destination floor, the machine passenger 90 may send a respective command 901 and the command may be transmitted via the wireless network 80 to the interaction safety control apparatus 200, the command 901 is uploaded to the elevator control device 110 in case that the interaction safety control apparatus 200 determines that the command 901 is safe with respect to the elevator system 10, avoiding causing the elevator system to run abnormally (e.g., running unstably, running disorderly, etc.) due to the elevator control device 110 being affected by the unsafe command, and also reducing the workload of the elevator control device 110 handling excessive unsafe commands from the machine passenger 90. Thus, in the elevator system 10 of embodiments of the present invention, the elevator control device 110 does not interact directly with the machine passenger 90, nor does the command 901 issued by the machine passenger 90 is directly sent to the elevator control device 110, but instead is detected and verified in the interaction safety control apparatus 200 to determine its safety with respect to the elevator system 10.

Specifically, a wireless communication module, e.g. those supporting 4G/5G/Wifi communication, may be disposed on the machine passenger 90, a respective wireless communication module may also be disposed in the interaction safety control apparatus 200, so that it may perform wireless communication connection with one or more machine passengers 90 via the wireless network 80 in real time. The wireless communication module of the interaction safety control apparatus 200, (e.g. the communication device 280 as shown in FIG. 2), may be configured with an interface 310, for example, as shown in FIG. 3, to receive the command 901 from each machine passenger 90, which, of course, sends information (e.g. dispatch information, elevator running state information, and the like) from the elevator system 10 to each machine passenger 90.

In an embodiment, the interaction safety control apparatus 200 may be part of the elevator system 10, which may be separately external with respect to the elevator control device 110 and is communicatively connected with the elevator control device 110; for example, the interaction safety control apparatus 200 may be manufactured separately and mounted in the elevator system 10 by connecting to the elevator control device 110 by way of a wired connection, so that an existing elevator system without the function of the interaction safety control apparatus 200 of the present invention may be easily and simply reformed, e.g., implemented by an external addition of one interaction safety control apparatus 200.

It will be understood that the interaction safety control apparatus 200 may also be implemented by integrated into the elevator control device 110 as needed; a interaction safety control apparatus 200 may also be shared with a plurality of elevator systems 10.

As shown in FIG. 2, the interaction safety control apparatus 200 may be implemented by a computer device of an embodiment of the present invention, which may be a general purpose computer, a special purpose computer, or a machine having computing and processing function based on a predetermined program, which may even be implemented by cloud computing.

Referring to the specific exemplary frame structure of the computer device 200 of the embodiment shown in FIG. 2, in a basic configuration 201, the computer device 200 typically includes a system memory 220 and one or more processors 210. The memory bus 230 may be used for communication between the processor 210 and the system memory 220.

Depending on the desired configuration, the processor 210 may be any type of processors, including but not limited to: a microprocessor (p P), a microcontroller (u C), a digital signal processor (DSP), or any combination thereof. The processor 210 may include one or more levels of cache such as a level 1 cache 211 and a level 2 cache 213, and may also include a processor core 215 and a register 217. The example processor core 215 may include an arithmetic logic unit (ALU), a floating point unit (FPU), a digital signal processing core (DSP Core), or any combination thereof. The example memory controller 219 may be used with the processor 210, or in some embodiments, the memory controller 219 may be a built-in part of the processor 210.

Depending on the desired configuration, the system memory 220 may be any type of memory, including but not limited to: volatile memory (such as RAM), non-volatile memory (such as ROM, flash memory, etc.), or any combination thereof. The system memory 220 may include an operating system 221, one or more applications 223, and program data 229. In some implementations, application 223 may be arranged to operate on an operating system with program data 229.

The computer device 200 may also include an interface bus 290 that facilitates communication from various interface devices (e.g., output device 260, peripherals interface 270, and communication device 280) to basic configuration 102 via bus/interface controller 250. Example output device 260 includes a graphics processing unit 261 and an audio processing unit 263. They may be configured to facilitate communication with various external devices such as a display or speaker via one or more A/V ports 265. Example peripherals interface 270 may include a serial interface controller and a parallel interface controller, which may be configured to facilitate communication via one or more I/O ports and external devices such as input devices (e.g., keyboards, mice, pens, voice input devices, touch input devices), or other peripherals (e.g., printers, scanners, and the like). The example communication device 280 may include a network controller 281, which may be arranged to be suitable for communicating with one or more other computer devices (e.g., computer devices on a machine passenger 90) via one or more communication ports 283.

Continuing as shown in FIG. 2, in an embodiment, a safe interaction control unit 227 is also included in the application 223 of the computer device 200. The safe interaction control unit 227 may be installed as a stand-alone software in the computer device 200 or embodied only as a piece of code; it will be understood that the existence form of the safe interaction control unit 227 in the computer device 200 is not limiting. The safe interaction control unit 227 may control the interaction safety between the machine passenger 90 and the elevator control device 110, i.e. determining the safety of the command 901 with respect to the elevator system based on the command 901 received from the machine passenger 90, and not sending the command 901 to the elevator control device 110 of the elevator system 10 in case that the command 901 is determined to be unsafe with respect to the elevator system 10.

The safe interaction control unit 227 may be contained in the elevator system 10 or the maintenance management system 800 and serve as a functional component of the elevator system 10. The specific functions and implementations of the safe interaction control unit 227 may be understood in conjunction with a method of interaction safety control of the embodiment shown in FIGS. 4-11 below.

Referring to FIG. 3, a schematic diagram of a module structure of a interaction safety control apparatus 200 or a computer device 200 of an embodiment of the present invention is shown. The interaction safety control apparatus 200 is configured with an interface 310; the interaction safety control apparatus 200 is further configured with a command safety judgement module 320, command transmission control module 330, and even configured with an information receiving module 340 supporting wired communication, which is disposed corresponding to the elevator control device 110.

Specifically, the interface 310 may be an interface supporting wireless communication, which may be implemented in a software defined manner on basis of a respective communication port 283. One or more sub-interfaces, for example one or more of the sub-interfaces 311-316, for receiving various types of commands 901 from the machine passenger 90 may also optionally be defined in the interface 310. The command types for the commands 901 from the machine passenger 90 that each sub-interface can receive may be determined, for example, by configuring each sub-interfaces in a software defined manner.

Specifically, the sub-interface 311 may receive a command type corresponding to requesting to register a destination floor, the sub-interface 312 may receive a command type corresponding to requesting the elevator state, the sub-interface 313 may receive a command type corresponding to requesting a call, the sub-interface 314 may receive a command type corresponding to requesting to hold the car door, the sub-interface 315 may receive a command type corresponding to requesting to unhold the car door, and the sub-interface 316 may receive a command type corresponding to state polling. Whether each sub-interface is safely opened to the machine passenger 90 may be predetermined in a software defined manner so that the safely opened sub-interface becomes a safe sub-interface; as such, other sub-interfaces otherwise than the safe sub-interface will be considered as unsafety interfaces, in the command safety judgement module 320, various commands of the respective command types received by the unsafety interfaces will be considered as unsafe commands with respect to the elevator system 10.

In an embodiment, the sub-interfaces in the interface 310 opened to the machine passenger 90 are only sub-interface 311 and/or sub-interface 312 (shown as the solid blocks), the sub-interfaces 311, 312 will become a first safe sub-interface 311 and a second safe sub-interface 312, respectively, as such, various commands of other types received by the sub-interfaces other than the first safe sub-interface 311 and the second safe sub-interface 312 will be considered by the command safety judgment module 320 as unsafe commands with respect to the elevator system; that is, other various types of commands other than requesting to register the destination floor (e.g., Car Call), requesting the elevator state will be considered as unsafe commands with respect to the elevator system, will be filtered out or not sent to the elevator control device 110 even if they are received by the sub-interface 313 to the sub-interface 316.

In yet another embodiment, other than sub-interfaces 311 and 312 (shown as the solid sub-blocks), the sub-interfaces in the interface 310 opened to the machine passenger 90 may also be selected from one or more of the sub-interfaces 313-316 (shown as the dashed sub-blocks), for example, the sub-interface 311, sub-interface 312, sub-interface 313, sub-interface 314, sub-interface 315, sub-interface 316 will respectively become the first safe sub-interface 311, the second safe sub-interface 312, a third safe sub-interface 313, a fourth safe sub-interface 314, a fifth safe sub-interface 315, a sixth safe sub-interface 316, in this way, various commands of other types received by the sub-interfaces (not shown) other than the first safe sub-interface 311 to the sixth safe sub-interface 316 will be considered by the command safety judgement module 320 as unsafe commands with respect to the elevator system; that is, other various types of commands other than requesting to register a destination floor (e.g., Car Call), requesting the elevator state, requesting a call (e.g., Hall Call), requesting to keep car door 121 open (e.g., Hold Car Door), requesting to release the car door (e.g., Unhold Car Door) and state polling (e.g., Hello) will be considered as unsafe commands with respect to the elevator system, will be filtered out or not sent to the elevator control device 110 even if received by their interface 310.

It will be understood that the sub-interfaces opened to the machine passenger 90 may be preset according to functional needs, etc., in case that the elevator system management personnel permit, but the open sub-interfaces do not change during process of using after being set, thus preventing the machine passenger 90 from sending various types of commands 901 to intrude the elevator system 10 and reducing the workload of the elevator control device 110. Of course, the number of open sub-interfaces may vary after being reset or predefined.

Continuing as shown in FIG. 3, the command safety judgment module 320 is configured to determine the safety of commands 901 with respect to the elevator system 10 based on the received commands 901. Various types of commands 901 may have respective predefined formats, the information of the commands 901 (i.e., command information) may specifically include a command type, an identifier of the machine passenger sending the command, and a receipt time, etc., and the command safety judgment module 320 may detect and analyze each command 901 to acquire its wanted command information, which may serve as an information basis for judging whether the command 901 is safe with respect to the elevator system 10.

Continuing as shown in FIG. 3, the command transmission control module 330 is configured not to send the unsafe command to the elevator control device 110 in case that the command 901 is determined to be unsafe with respect to the elevator system 10, thereby enabling as close as possible sending only the commands 110*a* that are safe with respect to the elevator system 10 to the elevator control device 110.

Continuing as shown in FIG. 3, the information receiving module 340 may be configured to receive various information of the elevator control device 110, for example, respective elevator run results of one or more commands of a certain machine passenger 90, current running state information of the elevator system 10, and the like.

Continuing as shown in FIG. 3, the interaction safety control apparatus 200 may be provided with a state determination module 350 that may be used to judge whether the machine passenger 901 is in an abnormal running state, in this way, if the machine passenger 901 interacting with the elevator system 10 is in an abnormal running state (e.g., a crash, network connection exception, an internal function failure, etc.), the interaction safety control apparatus 200 may discover timely, which is helpful for management personnel to perform maintenance operation and the like on the machine passenger 901, and may also avoid negatively affecting the running of the elevator system 10 (e.g., resulting in run exception of the elevator system, affecting the passenger experience) by the machine passenger 90 in the abnormal running state. Accordingly, the command safety judgement module 320 is further configured to, in according to the identifier of the machine passenger in the received command 901, judge whether the command comes from a machine passenger in an abnormal running state, and determine the command from the machine passenger 90 in the abnormal running state as an unsafe command with respect to the elevator system 10.

The interaction safety control method and the respective specific configuration of each modules in the above-described interaction safety control apparatus 200 of multiple embodiments of the present invention are illustrated below further in conjunction with the flowcharts of the interaction safety control methods shown in FIGS. 4-11.

Figure 4:
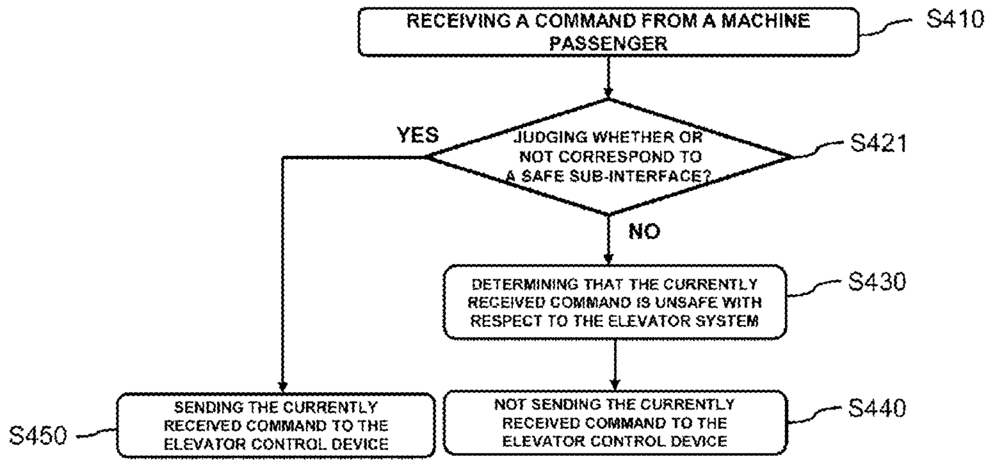
FIG. 4 is a flowchart of a method of interaction safety control according to a first embodiment of the present invention.

Shown in FIG. 4 is a flowchart of an interaction safety control method according to a first embodiment of the present invention. As shown in FIG. 4, first, in case that the machine passenger 90 has established a wireless connection with the interaction safety control apparatus 200, step S410 is performed: a command 901 from a machine passenger 90 is received. This step S410 may be implemented by the interface 310, the information of the command 901 may include a command type, an identifier of a machine passenger sending the command, and a receipt time, wherein the receipt time may be acquired by the interface 310.

In step S421, based on the command type of the command 901, it is judged whether the currently received command 901 belongs to a command type corresponding to a safe sub-interface that is pre-opened to the machine passenger 90.

In step S421, in an embodiment, the safe sub-interface pre-opened to the machine passenger 90 is selected from one or more of the following: a first safe sub-interface 311 corresponding to a command type of requesting to register the destination floor, a second safe sub-interface 312 corresponding to a command type of requesting an elevator state; the command correspondingly received by the first safe sub-interface 311 or the second safe sub-interface 312 is a relatively safe command type. In yet another embodiment, the safe sub-interface that is pre-opened to the machine passenger 90 may also be further selected from one or more of the following: a third safe sub-interface 313 corresponding to a command type of requesting a call, a fourth safe sub-interface 314 according to a command type of requesting to keep the car door open, a fifth safe sub-interface 315 corresponding to a command type of requesting to release the car door, a sixth safe sub-interface 316 corresponding to a command type of state polling; the command type correspondingly received by the safe sub-interface is a relatively safe command type. In step S430, in case that the currently received command 901 does not belong to a command type corresponding to any of the safe sub-interfaces (i.e., it is judged as "NO" in step S421), it is determined that the currently received command 901 is unsafe with respect to the elevator system 10.

In step S440, in case that the command is determined to be unsafe with respect to the elevator system 10, the command 901 is not sent to the elevator control device 110 of the elevator system 10; specifically, not sending the command 901 to the elevator control device 110 may be achieved by way of preventing sending, filtering, and the like.

In step S450, in case that the currently received command 901 belongs to the command type corresponding to any of the safe sub-interfaces (i.e., it is judged as "YES" in step S421), that is, the currently received command 901 may be determined to be substantially safe with respect to the elevator system 10, continuing sending the currently received command 901 to the elevator control device 110 so that the elevator control device 110 may control the elevator system 10 in response to that safe command of the machine passenger 90, e.g., to dispatch for the machine passenger 90, to keep the car door 121 open, etc..

The above steps S421 and S430 may be implemented in the command safety judgment module 320 of the interaction safety control apparatus 200, and the above steps S440 and S450 may be implemented in the command transmission control module 330 of the interaction safety control apparatus 200.

The interaction safety control method of the above embodiments may filter out the command 901 from the machine passenger 90 that is defined as unsafe from the aspect of command type, preventing various types of commands 901 of the machine passenger 90 from being uploaded to the elevator control device 110, facilitating ensuring safe and reliable running of the elevator system 10 and reducing the workload of the elevator control device 110.

Figure 5:
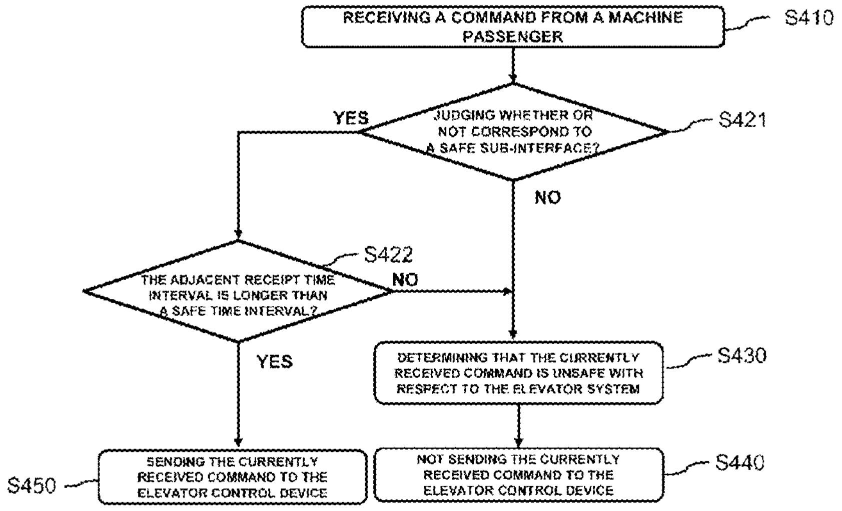
FIG. 5 is a flowchart of a method of interaction safety control according to a second embodiment of the present invention.

Shown in FIG. 5 is a flowchart of an interaction safety control method according to a second embodiment of the present invention, which adds step S422 compared to the safe interaction method of the embodiment shown in FIG. 4.

As shown in FIG. 5, in case that it is judged as "YES" in step S421, the process proceeds to step S422 to perform further safety check on the command 901 that has passed the previous checking.

In step S422, the adjacent receipt time interval $T_i$ of commands of the same command type from the same machine passenger is determined based on the receipt time of commands 901 from the same machine passenger 90, and the safety of the command 901 with respect to the elevator system is determined based on the determined adjacent receipt time interval $T_i$; specifically, if the adjacent receipt time interval $T_i$ of the currently received commands is less than the safe time interval $T_s$ (i.e., $T_i<T_s$) corresponding to the command type of that command, the process proceeds to step S430 to determine that the currently received command 901 is unsafe with respect to the elevator system 10; otherwise, the process proceeds to step S450.

Wherein the safe time interval $T_s$ is preset respectively according to the minimum time required by a command of respective command type to be normally executed once by the elevator system, in this way, corresponding to different command types, different safe time intervals $T_s$ may be set correspondingly. Exemplarily, for a command requesting to register a destination floor, $T_s$=3 seconds; for a command requesting a call, $T_s$=10 seconds; for a command requesting to keep the car door open, $T_s$=3 seconds; for a command to release the car door, $T_s$=10 seconds; for a command of state polling, $T_s$=30 seconds.

The above step S422 may also be implemented in the command safety judgment module 320 of the interaction safety control apparatus 200.

The interaction safety control method of the second embodiment above may filter out repeated and too frequent commands from the same machine passenger 90, further reducing such unsafe commands from causing disorder to the running of the elevator system 10, compared to the interaction safety control method of the first embodiment, it further ensures safe and reliable running of the elevator system 10 and reduces the workload of the elevator control device 110.

It will be understood that in other embodiments, step S421 may be omitted, but step S422 retained to enable safety interaction control.

Figure 6:
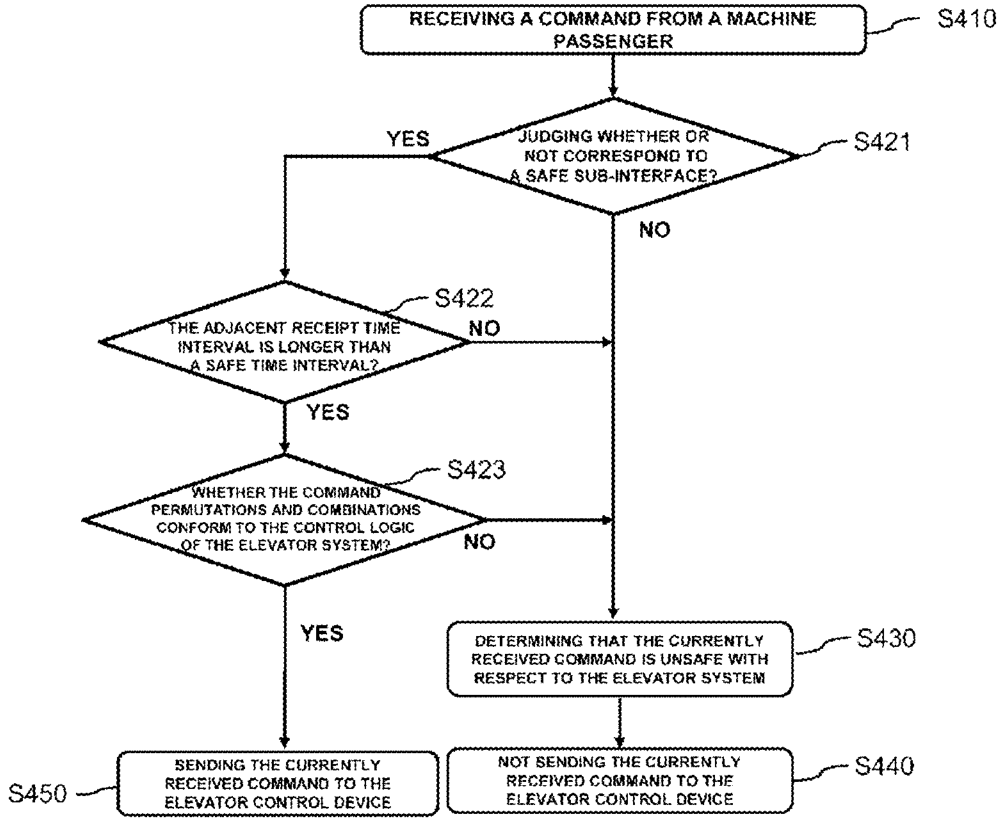
FIG. 6 is a flowchart of a method of interaction safety control according to a third embodiment of the present invention.

Shown in FIG. 6 is a flowchart of an interaction safety control method according to a third embodiment of the present invention, which adds step S423 compared to the safe interaction method of the embodiment shown in FIG. 5.

As shown in FIG. 6, if it is judged as "YES" in step S422, the process proceeds to step S423 to perform further safety check on the command 901 that has passed the previous checking.

In step S423, it is judged whether the command permutations and combinations conform to the control logic of the elevator system 10. Specifically, if the first and second commands received in sequence from the same machine passenger 90 have different command types from each other and previously received first commands have been sent to the elevator control device 110, it is judged that whether the command permutations and combinations containing the first command and the second command conform to the control logic of the same passenger of the elevator system 10; if the command permutations and combinations do not conform to the control logic (i.e., it is judged as "NO"), the process proceeds to step S430 to determine that the currently received second command is unsafe with respect to the elevator system 10; otherwise, the process proceeds to step S450.

Wherein, the control logic of the elevator system 10 is known to the elevator system 10 and may be stored in the interaction safety control apparatus 200.

In an embodiment, step S423 may further include a process of forming command permutations and combinations corresponding to the currently received second command. Specifically, a predetermined time period derived by subtracting a respective predetermined time period from the receipt time according to the receipt time of the currently received second command is determined, wherein the predetermined time period is related to the command type of the second command, for example, different predetermined time may be set for different command types; further, a first command from the same machine passenger contained within a predetermined time period which has been received and sent to the elevator control device is determined, and command permutations and combinations that contain the first command and the second command formed in a sequential order of the receipt time are formed.

Of course, if the first command that has been received and sent to the elevator control device is not contained within a predetermined time period, the command permutations and combinations being used are judged to be absent in step S423, and it is understood that it is judged as "YES" in step S423.

The above step S423 may also be implemented in the command safety judgment module 320 of the interaction safety control apparatus 200.

The interaction safety control method of the third embodiment above may prevent the same machine passenger 90 from sending command combinations to the elevator system 10 which do not conform to its control logic, further reducing the disorder from such unsafe commands of the running of the elevator system 10, and compared to the interaction safety control method of the second embodiment, it further ensures safe and reliable running of the elevator system 10 and reduces the workload of the elevator control device 110.

In order to understand the technical effect of the interaction safety control method of the third embodiment above, the following exemplary description is given in detail. If the machine passenger 90 issues a command 9011 to request to keep the car door open at time $t_1$, and issues subsequently a command 9012 to request to register the destination floor at time $t_2$ after 2 seconds, upon receiving the command 9012, the command safety judgment module 320 may generate command permutations and combinations containing the commands 9011 and 9012 within a corresponding 3-second time period, as the command permutations and combinations obviously do not conform to the control logic of the elevator system 10, the command 9012 is likely to be a command sent by the machine passenger 90 by mistake, which negatively affects the run safety of the elevator system 10, and therefore, the command 9012 will be prevented from being uploaded to the elevator control device 110.

Figure 7:
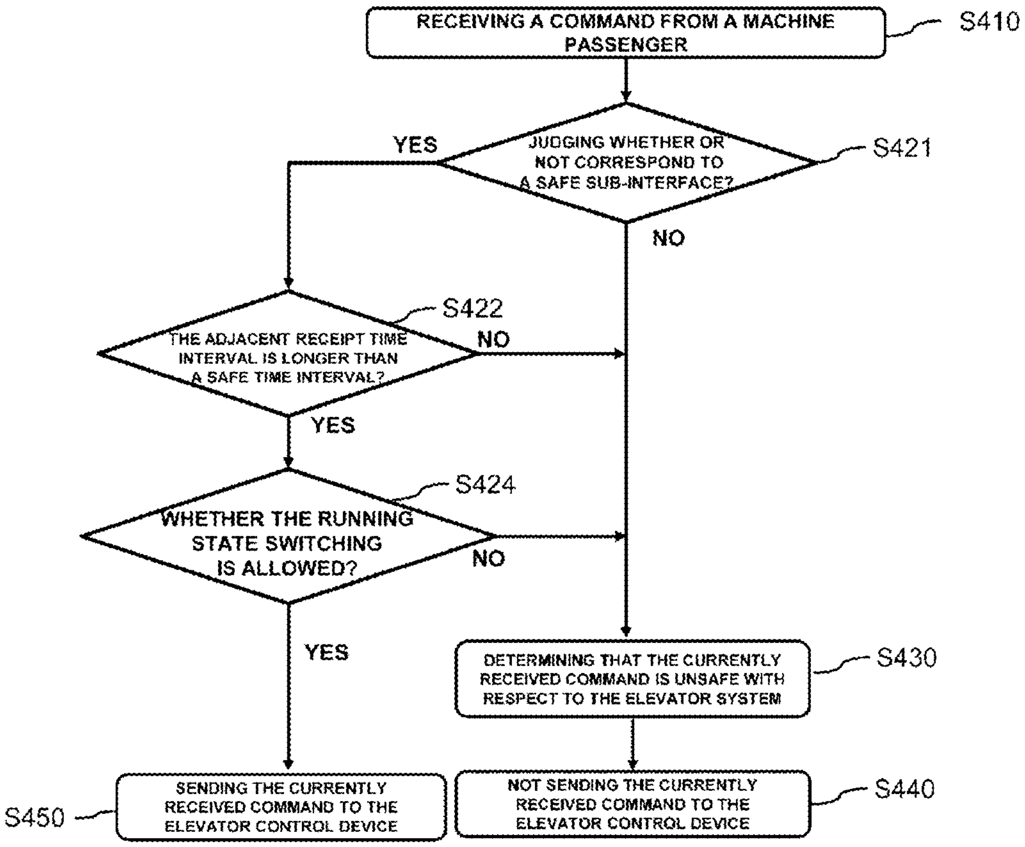
FIG. 7 is a flowchart of a method of interaction safety control according to a fourth embodiment of the present invention.

Shown in FIG. 7 is a flowchart of an interaction safety control method according to a fourth embodiment of the present invention, which adds step S424 compared to the safe interaction method of the embodiment shown in FIG. 5.

As shown in FIG. 7, in case that it is judged as "YES" in step S422, the process proceeds to step S424 to perform further safety check on the command 901 that has passed the previous checking.

In step S424, it is judged whether the running state to be entered required by the command is allowed, wherein the safety of the received command with respect to the elevator system 10 is determined based on the received command and its command type and the current running state information of the elevator system. Wherein the current running state information of the elevator system 10 may be received from the elevator control device 110 through the information receiving module 340.

Specifically, if it is not allowed for the elevator system 10 to switch from the current running state of the elevator system 10 to the running state to be entered required by the command, it is determined that the currently received command is unsafe with respect to the elevator system. Illustratively, the current running state of the elevator system is "Car in Travel", the running state requested to enter corresponding to a command for requesting keeping the car door open issued by the machine passenger 90 is to keep the car door 121 open, such state switching is not allowed in any existing elevator system, thus it is determined that the command for currently requesting keeping the car door open is unsafe with respect to the elevator system 10.

Wherein whether the elevator system 10 does not allow certain running state switching is known for the elevator system 10 and may be stored in the interaction safety control apparatus 200.

The above step S424 above may also be implemented in the command safety judgment module 320 of the interaction safety control apparatus 200.

The interaction safety control method of the fourth embodiment above may prevent a certain machine passenger 90 from sending command to the elevator system 10 which does not conform to the current actual running state of the elevator system 10, further reducing such unsafe commands from causing disorder to the running of the elevator system 10, compared to the interaction safety control method of the second embodiment, it further ensures safe and reliable running of the elevator system 10 and reduces the workload of the elevator control device 110.

Figure 8:
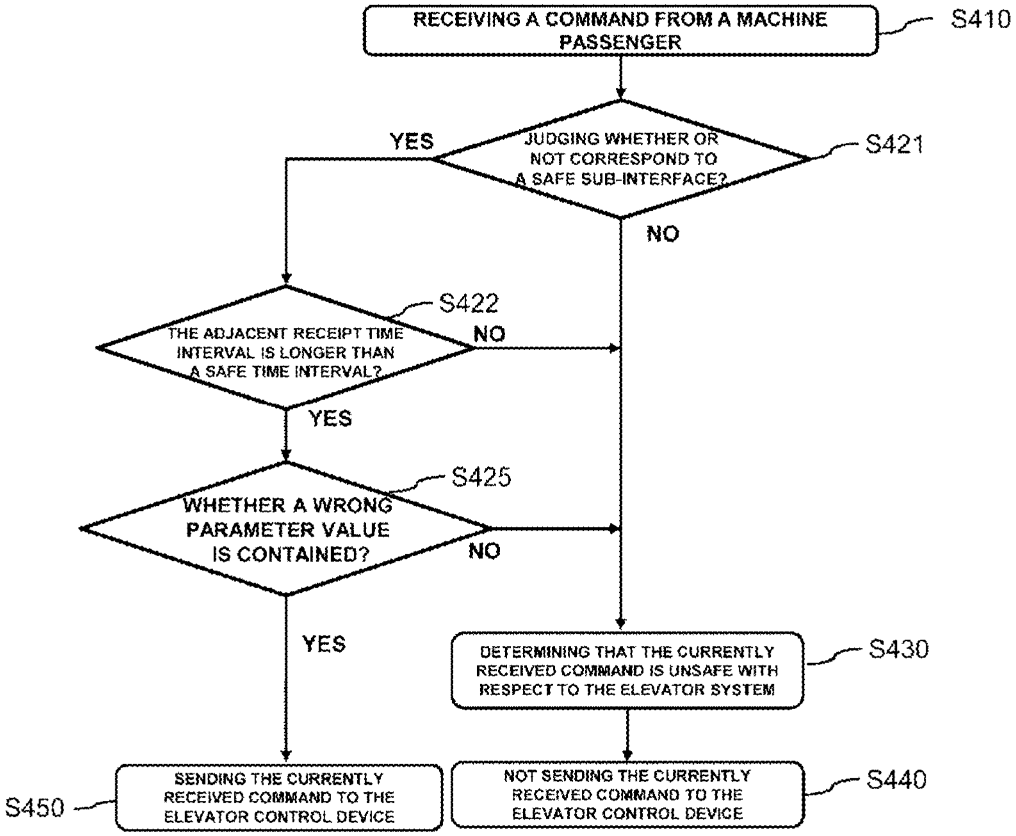
FIG. 8 is a flowchart of a method of interaction safety control according to a fifth embodiment of the present invention.

Shown in FIG. 8 is a flowchart of an interaction safety control method according to a fifth embodiment of the present invention, which adds step S425 compared to the safe interaction method of the embodiment shown in FIG. 5.

As shown in FIG. 8, if it is judged as "YES" in step S422, the process proceeds to step S425 to perform further safety check on the command 901 that has passed the previous checking.

In step S425, it is judged whether a command of a certain type contains a wrong parameter value.

Specifically, it is judged whether a wrong parameter value of a respective command type is contained in the command based on the received command 901 and the command type thereof; if the command 901 contains a wrong parameter value, it is determined that the currently received command is unsafe with respect to the elevator system 10. Illustratively, in terms of commands requesting to register the destination floor, if the destination floor allowed to be register by current elevator car 120 does not include, for example, 5-10 floors, and if the command 901 received from the machine passenger 90 is for requesting to register destination floor 8, the command 901 for requesting to register the destination floor may then be determined to contain a wrong parameter value.

It should be understood that for different command types, respective wrong parameter value may be predefined and stored in the interaction safety control apparatus 200.

The above step S425 may also be implemented in the command safety judgment module 320 of the interaction safety control apparatus 200.

The interaction safety control method of the fifth embodiment above may filter out commands from the machine passenger 90 that include wrong parameter values, further reducing such unsafe commands from causing disorder to the running of the elevator system 10, compared to the interaction safety control method of the second embodiment, it further ensures safe and reliable running of the elevator system 10 and reduces the workload of the elevator control device 110.

Figure 9:
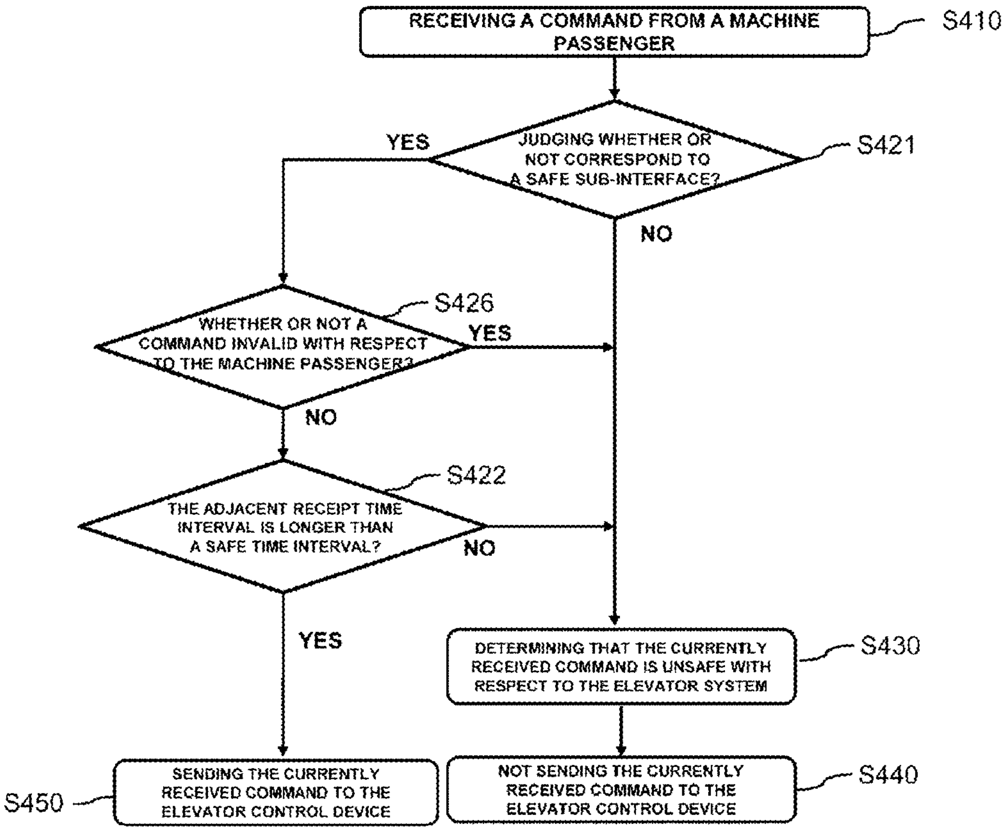
FIG. 9 is a flowchart of a method of interaction safety control according to a sixth embodiment of the present invention.

Shown in FIG. 9 is a flowchart of an interaction safety control method according to a sixth embodiment of the present invention, which adds step S426 compared to the safe interaction method of the embodiment shown in FIG. 5.

As shown in FIG. 9, if it is judged as "YES" in step S421, the process proceeds to step S426 to perform further safety check on the command 901 that has passed the checking.

In step S426, it is judged that whether the command 901 is a command that is valid with respect to the elevator system 10 but invalid with respect to the machine passenger 90 based on the received command 901. If the received command 901 is a command that is valid with respect to the elevator system 10 but invalid with respect to the machine passenger 90 (i.e., if it is judged as "YES"), it is determined that the received command 901 is unsafe with respect to the elevator system 10; if the received command 901 is a command that is valid with respect to the elevator system 10 and valid with respect to the machine passenger 90 (i.e., if it is judged as "NO"), the process proceeds to step S422.

It will be understood that commands that are valid with respect to the elevator system 10 but invalid with respect to the machine passenger 90 may be predefined and stored in the interaction safety control apparatus 200. For example, certain commands of the elevator system 10 are open and valid (e.g., lock/unlock COP buttons) for common passengers or maintenance personnel, but which actually completely invalid to the machine passenger 90, nor do them open to the machine passenger 90, therefore many commands of this type may be predefined and stored as unsafe commands in the interaction safety control apparatus 200.

The above step S426 may also be implemented in the command safety judgment module 320 of the interaction safety control apparatus 200.

The interaction safety control method of the sixth embodiment above may filter out commands 901 defined as invalid with respect to the machine passenger 90 from, for example, command type perspectives, as a result, compared to the interaction safety control method of the second embodiment, it further ensures safe and reliable running of the elevator system 10 and reduces the workload of the elevator control device 110.

Figure 10:
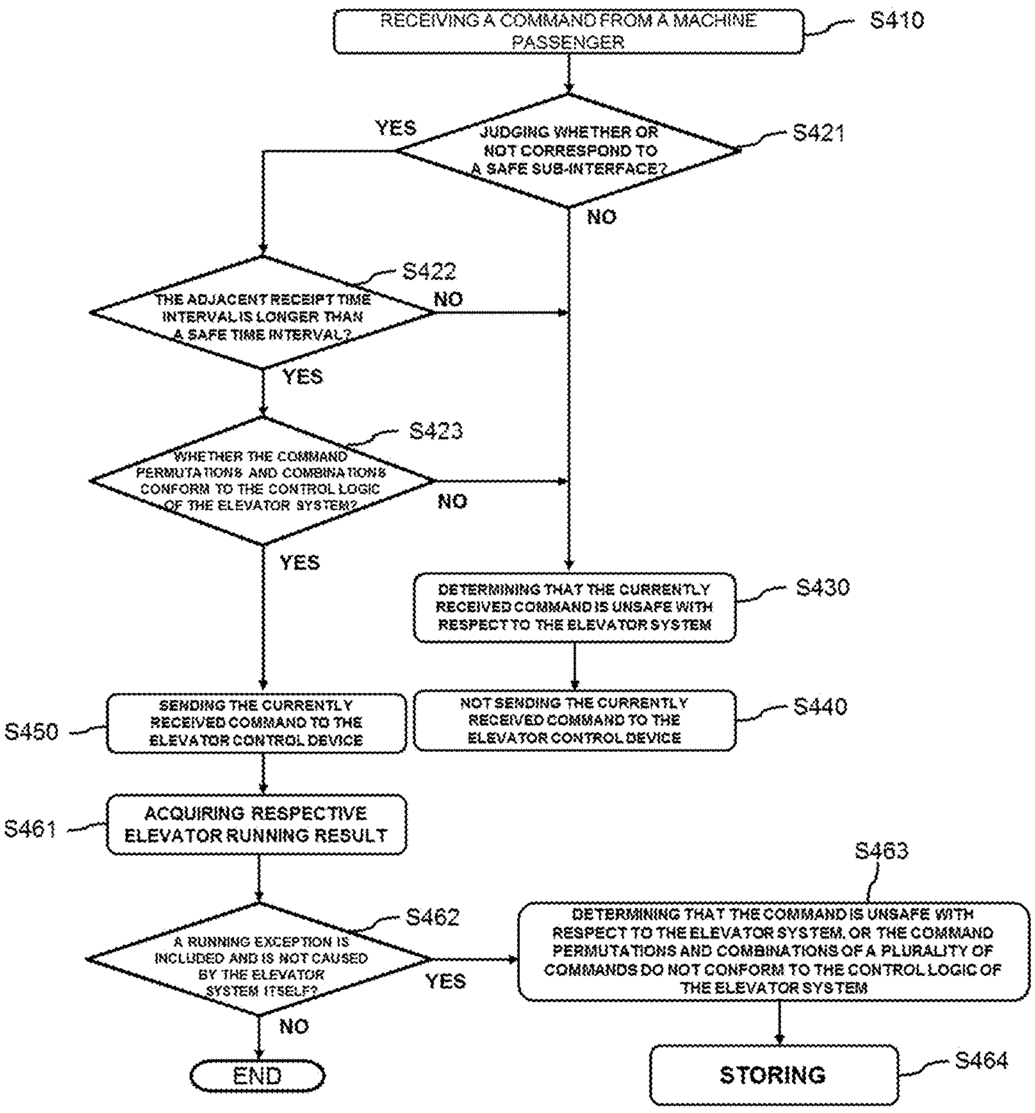
FIG. 10 is a flowchart of a method of interaction safety control according to a seventh embodiment of the present invention.

Shown in FIG. 10 is a flowchart of an interaction safety control method according to a seventh embodiment of the present invention, which adds steps S461-S464 compared to the safe interaction method of the embodiment shown in FIG. 6.

In step S461, in case that the commands 901 of the machine passenger 90 are uploaded to the elevator control device 110, the elevator system 10 will perform a respective operation (e.g., a dispatching operation) and generate a respective run result; the respective elevator run results corresponding to one or more commands 901 that have been sent to the elevator control device 110 may be acquired by the information receiving module 340.

In step S462, it is judged whether the elevator run result includes a run exception (e.g., elevator run instability, abnormal running, elevator system generating disorder, etc.) and the run exception is not caused by the elevator system 10 itself.

Specifically, the run exception includes one or more of the following: the persistent opening time of a car door/landing door being longer than or equal to a respective predetermined value; the opening/closing frequency of the car door/landing door being greater than or equal to a respective predetermined value; the persistent travelling time of the car being shorter than or equal to a respective predetermined value; the persistent travelling time of the car being longer than or equal to a respective predetermined value; the elevator control device having a logical error, and so on.

Specifically, in step S462, it is judged whether the same run exception that occurs multiple times (e.g., N times, N being greater than or equal to 2) is associated with commands sent multiple times (e.g., N times) by the same machine passenger; if it is judged as "YES", the process proceeds to step S463.

If multiple occurrences of the same run exception are respectively associated with commands sent multiple times by different machine passengers, it is likely that the run exception is not caused by a machine passenger, but may be, for example, caused by a problem with the elevator system 10 itself, and thus it may be generally judged that the run exception is not caused by the elevator system 10 itself.

In step S463, if it is judged as "YES" in step S462, it is determined that the one command is unsafe with respect to the elevator system 10, or the command permutations and combinations of the plurality of commands do not conform to the control logic of the elevator system 10.

In step S464, for the commands that have been determined to be unsafe with respect to the elevator system, or the command permutations and combinations that have been determined not to conform to the control logic of the elevator system 10, they may be stored, for example, in the interaction safety control apparatus 200. These stored commands and/or command permutations and combinations may be used to determine the safety of the subsequently received commands 901 with respect to the elevator system, such as being subsequently applied in step S423; thereby, the above-described run exception caused by the machine passenger 90 may be effectively prevented.

The interaction safety control method of the seventh embodiment above may obtain unsafe commands and/or command permutations and combinations that do not conform to the control logic of the elevator system 10 by self-learning, as a result, compared to the interaction safety control method of the embodiment of FIG. 6, it may further ensures safe and reliable running of the elevator system 10.

Figure 11:
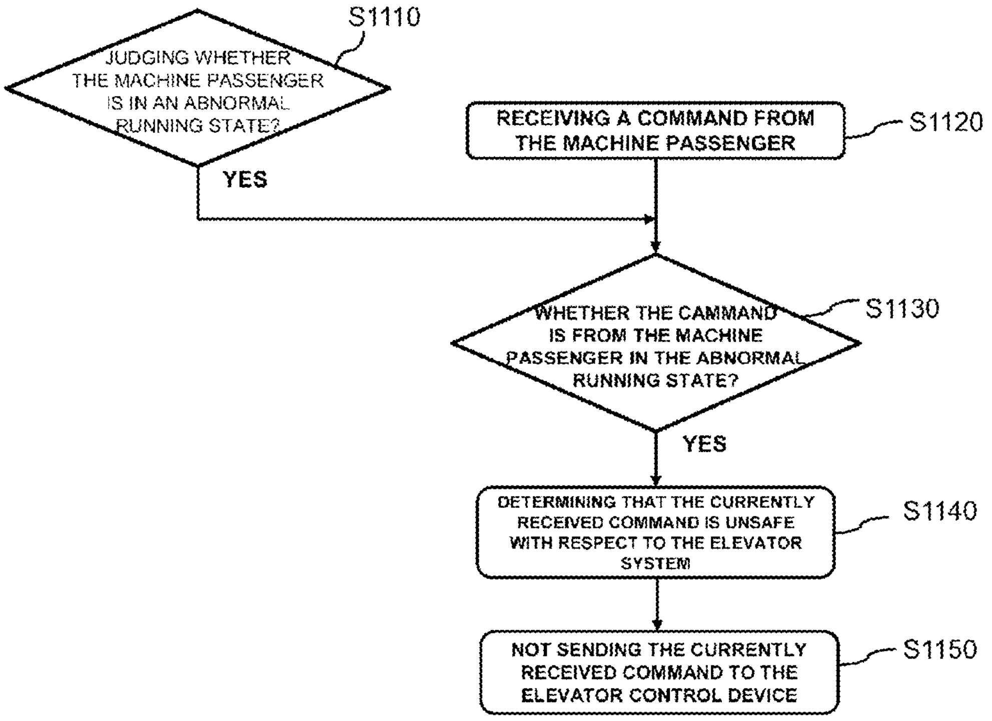
FIG. 11 is a flowchart of a method of interaction safety control according to an eighth embodiment of the present invention.

Shown in FIG. 11 is a flowchart of an interaction safety control method according to an eighth embodiment of the present invention.

First, in step S1110, it is judged whether the machine passenger 90 is in an abnormal running state. If it is judged as "YES", the ID of the machine passenger 90 in the abnormal running state will be recorded in the interaction safety control apparatus 200 and used in step S1130; if it is judged as "NO", the process may proceed to interaction safety control method of any of the first through seventh embodiments shown above.

At the same time, in step S1120, the commands 901 from a plurality of machine passengers 90 are received.

Wherein step S1120 is substantially the same as the arrangement S410 of the interaction safety control method of the embodiment shown in FIG. 4, and detailed description thereof is omitted herein.

In step S1130, it is judged whether a certain currently received command 90 is from a machine passenger in an abnormal running state. Illustratively, a respective judgement result may be obtained by extracting the identifier of the machine passenger contained in a certain currently received command 90 and then comparing the identifier to an identifier of the machine passenger 90 that has been recorded as being in the abnormal running state.

If it is judged as "YES", the process proceeds to step S1140 to determine that the currently received command is unsafe with respect to the elevator system 10 so that the commands from the machine passenger that is in the abnormal running state are all determined to be unsafe commands with respect to the elevator system 10.

Further, in step S1150, the command 901 is not sent to the elevator control device 110 of the elevator system 10; specifically, not sending the commands 901 to the elevator control device 110 may be achieved by preventing sending, filtering, and the like.

In this way, commands of the machine passenger in the abnormal running state will all be filtered out by the interaction safety control apparatus 200 external to the elevator system 10, avoiding continuous negative impact on the safe running of the elevator system 10 by machine passengers in the abnormal running state (such as machine passengers hijacked by hackers).

The above step S1110 may specifically be implemented in the state determination module 350 of the interaction safety control apparatus 200, and steps S1130 and S1140 may be implemented in the command safety judgment module 320 of the interaction safety control apparatus 200.

The above step S1110 may specifically be implemented by a combination of any one or more of the following examples.

In the exemplary first manner, acquiring respective elevator run results corresponding to one or more commands from a certain machine passenger 90 that have been sent to the elevator control device 110; judging whether the same run exception occurring multiple times (e.g., N times, N being greater than or equal to 2) is associated with commands 901 sent by the same machine passenger (e.g., the same command 901 sent by the same machine passenger N times) if the elevator run result includes a run exception; and if it is judged as "YES", the machine passenger is determined to be in an abnormal running state. Optionally, if the elevator run result includes a run exception, a first prompt information (e.g., alarm information regarding the run exception of the elevator system) is issued.

It should be noted that if the same run exception occurred multiple times are respectively associated with commands 901 sent by a plurality of different machine passengers, it is likely that the run exception is not caused by of the machine passenger 90, but is likely to be caused, for example, by a problem with the elevator system 10 itself, or is likely to be caused by other passengers' calling operation.

In an exemplary second manner, based on the results acquired by the interaction safety control method of any of the embodiments of FIGS. 4-10 above, statistically analysis which machine passengers 90 the commands that are unsafe with respect to the elevator system 10 are from; for example, counting the frequency at which each machine passenger 90 sends an unsafe command for a certain period of time to obtain respective statistical information, also for example, counting the number of times each machine passenger 90 sends unsafe commands according to command type; the specific statistical manner may be selected according to the respective requirements. Further, it is determined which machine passengers 90 are in an abnormal running state based on the statistical information obtained about the machine passenger 90 obtained by statistical analysis; illustratively, if the statistical information indicates that a certain machine passenger 90 sends unsafe commands of a certain command type too frequently within a certain period of time, it may be determined that the machine passenger 90 has a fault or run exception in terms of sending commands of that command type.

In an exemplary third manner, it is judged whether the respective machine passenger is in an abnormal running state by means of state polling information issued from one side of the interaction safety control apparatus 200 and a response command of the machine passenger 90 for the state polling information.

Specifically, first, constantly sending or broadcasting state polling information to the machine passenger 90 periodically; as a machine passenger, if it is in a normal running state, the respective response commands will be normally feedback periodically to indicate that it is likely to be in a normal running state; if the machine passenger 90 is in certain abnormal running states (e.g., a crash, a wireless network connection exception, etc.), it cannot feedback the respective response command. As such, the state polling information may be periodically sent from the interaction safety control apparatus 200 to the machine passenger 90, and in case that the machine passenger 90 is in a normal running state, the interaction safety control apparatus 200 may also periodically receive response commands from the machine passenger.

Further, it is judged whether a response command for the state polling information fed back from the machine passenger 90 is received; if it is judged as "NO" (i.e., the response command is not received), it is determined that the respective machine passenger 90 is in an abnormal running state.

In this way, it is possible to quickly and conveniently discover whether the machine passenger 90 is in an abnormal running state, and in particular to effectively discover the abnormal running state where the machine passenger 90 fails to interact with the interaction safety control apparatus 200 or the elevator system 10, for example, when a machine passenger 90 fails to come out of the elevator car 120 due to a fault such as a crash, such abnormal running state may be discovered timely by the above third manner.

In an exemplary fourth embodiment, it is judged whether the respective machine passenger 90 is in an abnormal running state by means of the state representation information issued from one side of the machine passenger 90.

Specifically, the machine passenger 90 may continuously issue state representation information to the interaction safety control apparatus 200 periodically, the state representation information may reflect the running state of the machine passenger 90, and may even include specific fault information. In particular, in case that certain functional modules inside the machine passenger 90 fail (e.g., a walking mechanism jam, etc.), the machine passenger 90 may actively send state representation information for representing that its state is abnormal to the interaction safety control apparatus 200. It should be noted that, a respective fault diagnosis module may be configured inside the machine passenger 90 to acquire respective fault information, thereby determining its state exception.

Further, if the interaction safety control apparatus 200 receives the state representation information actively sent from the machine passenger 90 for representing that its state is abnormal, the machine passenger 90 is determined to be in an abnormal running state. Of course, if the interaction safety control apparatus 200 receives the state representation information actively sent from the machine passenger 90 for representing that its state is normal, it may be determined that the machine passenger 90 is in a normal running state.

In this way, it is possible to quickly and conveniently discover whether the machine passenger 90 is in an abnormal running state, and in particular can effectively discover the abnormal running state where the machine passenger 90 may normally interact with the interaction safety control apparatus 200 or the elevator system 10 while its certain functional modules inside fail, when a machine passenger 90 fails to come out of the elevator car 120 due to a fault (e.g., a walking mechanism jam, the power source is insufficient for driving it to walk, certain control modules are hijacked by hackers, etc.), the fourth manner above may discover such abnormal running state timely.

It should be noted that the first and second manner above are primarily to acquire respective information from one side of the elevator system 10 and analyze and process the information by the interaction safety control apparatus 200 to determine or discover abnormal running state of the machine passenger 90; the third and fourth manner above are primarily to acquire respective feedback information from the machine passenger 90 to determine or discover abnormal running state of the machine passenger 90. They may be applied in combination with each other.

It should be understood that the abnormal running state of the machine passenger 90 is varied widely and may correspond to different types of machine passengers 90, which may also differ in their corresponding abnormal running state, and even more new abnormal running state might emerge in the future. The various manner of the above examples are behaviors with differentiation in determining a variety of specific abnormal running state, e.g. there may be shortcomings (e.g., insufficient accuracy) in determining a certain specific abnormal running state, but there is an advantage in determining another abnormal running state; thus, starting from their respective advantages, the methods may be applied in combination with each other, for example, the above third manner is used in combination with the third manner, that is, the running state of the machine passenger 90 is judged based on both the response command and the state representation information.

In yet another embodiment, in case that the machine passenger 90 is determined to be in an abnormal running state, the interaction safety control apparatus 200 may send at least a second prompt information, e.g. alarm information, representing that the respective machine passenger 90 is in an abnormal running state to the maintenance management system (not shown in figures); optionally, the second prompt information may also include an identifier of the respective machine passenger, a fault type of the respective machine passenger, the position information of the respective machine passenger with respect to the elevator system, etc., which is very helpful for maintenance management personnel to quickly and conveniently locate the fault and timely maintain the machine passenger 90.

It should be noted that, the various interaction safety control methods of the above examples may be implemented primarily in the computer device 200 or the safe interaction control unit 227 of computer device 200.

It should be noted that, the computer device 200 of the above embodiments of the present invention may be implemented by computer program commands, for example, implemented by a dedicated APP, these computer program commands may be provided to a processor of a general purpose computer, a special purpose computer, or other programmable data processing device to constitute the computer device 200 of embodiments of the present invention, also, these commands, which may be executed by a processor of a computer or other programmable data processing device, create units or components for implementing the functions/operations specified in the flowcharts and/or blocks and/or one or more flowchart blocks.

Also, these computer program commands may be stored in a computer-readable memory which may instruct a computer or other programmable processor to implement functions in a specific manner such that the commands stored in the computer-readable memory constitute an article of manufacture that includes the command components implementing the functions/operations specified in one or more blocks of the flowcharts and/or block diagrams.

It should also be noted that, in some alternative implementations, the functions/operations shown in the blocks may occur out of the order shown in the flowcharts. For example, two blocks shown in succession may, in fact, be executed substantially concurrently or the blocks may sometimes be executed in the reverse order, depending upon the functions/operations involved.

It should be noted that, elements disclosed and depicted herein (including flowcharts, block diagrams in the figures)

mean logical boundaries between elements. However, according to software or hardware engineering practices, the depicted elements and their functions may be executed on a machine by a computer executable medium having a processor capable of executing program commands stored thereon as a monolithic software structure, as a stand-alone software module, or as a module using external programs, code, services, etc. or any combination thereof, and all such execution schemes may fall within the scope of the present disclosure.

Although the different non-limiting embodiments have specifically illustrated assemblies, implementations of the invention are not limited to these specific combinations. It is possible to use some of the assemblies or features from any of the non-limiting implementations in combination with features or components from any other non-limiting implementations.

Although particular order of steps is shown, disclosed, and claimed, it is to be understood that the steps may be implemented, separated or combined in any order unless otherwise indicated and will still benefit from the present disclosure.

The foregoing description is exemplary and is not defined to be limited thereto. Various non-limiting implementations are disclosed herein, however, one of ordinary skill in the art will recognize that various modifications and alternations will fall within the scope of the appended claims in light of the above teachings. It will, therefore, be understood that within the scope of the appended claims, the disclosure may be practiced other than specific disclosure. For this reason, the appended claims should be studied to determine the true scope and content.

What is claimed is:

1. An interaction safety control method between an elevator system and a machine passenger, comprising:

receiving a command from the machine passenger;

based on a received command, determining the safety of the command with respect to the elevator system; and in case that the command is determined to be unsafe with respect to the elevator system, not sending the command to an elevator control device of the elevator system;

wherein information of the command comprises an identifier of the machine passenger sending the command, and a command type;

the determining the safety of the command with respect to the elevator system comprise:

based on the received command, judging whether it is a command that is valid with respect to the elevator system but invalid with respect to the machine passenger;

if the received command is a command that is valid with respect to the elevator system but invalid with respect to the machine passenger, determining that the received command is unsafe with respect to the elevator system and preventing the received command from being sent to an elevator control device thereby preventing operation of the elevator system in response to the received command.

2. The interaction safety control method of claim 1, wherein information of the command comprises a command type; the determining the safety of the command with respect to the elevator system comprise:

based on the command type of the command, judging whether a currently received command belongs to the command type corresponding to a safe sub-interface which is pre-opened to the machine passenger; and determining that the currently received command is unsafe with respect to the elevator system in case that the currently received command does not belong to the command type corresponding to any of the safe sub-interfaces.

3. The interaction safety control method of claim 1, wherein the safe sub-interface that is pre-opened to the machine passenger is selected from one or more of the following:

a first safe sub-interface that corresponds to the command type of requesting to register a destination floor;

a second safe sub-interface that corresponds to the command type of requesting an elevator state.

4. The interaction safety control method of claim 3, wherein the safe sub-interface that is pre-opened to the machine passenger is further selected from one or more of the following:

a third safe sub-interface that corresponds to the command type of requesting a call;

a fourth safe sub-interface that corresponds to the command type of requesting to keep a car door open;

a fifth safe sub-interface that corresponds to the command type of requesting to release the car door;

a sixth safe sub-interface that corresponds to the command type of state polling.

5. The interaction safety control method of claim 1, wherein the command that is invalid with respect to the machine passenger is predefined.

6. The interaction safety control method of claim 1, wherein information of the command comprises a command type;

the determining the safety of the command with respect to the elevator system comprise:

based on the received command and the command type thereof and current running state information of the elevator system, determining the safety of the received command with respect to the elevator system.

7. The interaction safety control method of claim 6, wherein in the process of determining the safety of the received command with respect to the elevator system, if switching from the current running state of the elevator system to the running state to be entered required by the command is not allowed by the elevator system, determining that the currently received command is unsafe with respect to the elevator system.

8. The interaction safety control method of claim 1, wherein information of the command comprises a command type;

the determining the safety of the command with respect to the elevator comprise:

based on the received command and the command type thereof, judging whether a wrong parameter value of a respective command type is contained in the command; and if the received command contains the wrong parameter value, determining that the currently received command is unsafe with respect to the elevator system.

9. The interaction safety control method of claim 1, further comprising:

acquiring a respective elevator run result corresponding to one or more commands that have been sent to the elevator control device;

if the elevator run result includes a run exception and the run exception is not caused by the elevator system itself, determining that the one command is unsafe with respect to the elevator system, or command permutations and combinations of a plurality of commands do not conform to a control logic of the elevator system.

10. The interaction safety control method of claim 9, wherein the run exception includes one or more of:

a persistent opening time of a car door/landing door being longer than or equal to a respective predetermined value;

an opening/closing frequency of the car door/landing door being greater than or equal to a respective predetermined value;

a persistent travelling time of the car being shorter than or equal to a respective predetermined value;

the persistent travelling time of the car being longer than or equal to a respective predetermined value;

the elevator control device having a logical error.

11. The interaction safety control method of claim 9, further comprising:

storing the commands that have been determined to be unsafe with respect to the elevator system or the command permutations and combinations that have been determined not to conform to the control logic of the elevator system;

based on the commands and/or the command permutations and combinations being stored, determining the safety of subsequently received commands with respect to the elevator system.

12. The interaction safety control method of claim 1, further comprising the steps of:

judging whether the machine passenger is in an abnormal running state; and determining that the command from the machine passenger in the abnormal running state is unsafe with respect to the elevator system.

13. The interaction safety control method of claim 12, wherein in the process of judging whether the machine passenger is in the abnormal running state:

acquiring respective elevator run results corresponding to one or more commands from a certain machine passenger which have been sent to the elevator control device;

if the elevator run result includes a run exception, judging whether a same run exception occurring multiple times is associated with the command sent by a same machine passenger;

if it is judged as "YES", determining that the machine passenger is in the abnormal running state.

14. The interaction safety control method of claim 13, wherein in the process of judging whether the machine passenger is in the abnormal running state:

if the elevator run result includes the run exception, issuing a first prompt information.

15. The interaction safety control method of claim 12, wherein in the process of judging whether the machine passenger is in the abnormal running state:

statistically analyzing which machine passengers the commands that are unsafe with respect to the elevator system come from;

based on statistical information about the machine passengers obtained by statistical analysis, determining which machine passengers are in the abnormal running state.

16. The interaction safety control method of claim 12, wherein the steps of judging whether the machine passenger is in the abnormal running state comprise:

wirelessly sending state polling information to the machine passenger;

judging whether a response command for the state polling information fed back from the machine passenger is received; and if the response command is not received, determining that a respective machine passenger is in the abnormal running state.

17. The interaction safety control method of claim 16, wherein the state polling information is sent to the machine passenger periodically and in case that the machine passenger is in a normal running state, the response command can be received periodically from the machine passenger.

18. The interaction safety control method of claim 12, wherein the steps of judging whether the machine passenger is in the abnormal running state comprise:

if state representation information actively sent from the machine passenger for representing that its state is abnormal is received, determining that the machine passenger is in the abnormal running state.

19. The interaction safety control method of claim 12, further comprising the steps of:

sending, to a maintenance management system, a second prompt information at least representing that a respective machine passenger is in the abnormal running state.

20. A computer device comprising a memory, a processor, and a computer program stored on the memory and executable on the processor, wherein the processor, when running the program, implementing the steps of the interaction safety control method according to claim 1.

21. An elevator system comprising one or more elevator cars, an elevator control device for controlling the one or more elevator cars to travel; wherein, further comprising:

a safe interaction control unit configured in the computer device of claim 20;

wherein the elevator control device wirelessly interacts with one or more machine passengers to acquire commands from the machine passenger via the computer device, and the elevator control device controls, through the safe interaction control unit, interaction safety between the elevator system and the machine passenger.

22. The elevator system of claim 21, wherein the computer device is separately external with respect to the elevator control device and is communicatively connected with the elevator control device.

23. A computer readable storage medium having stored thereon a computer program, wherein the program is executable by a processor to implement the steps of the interaction safety control method according to claim 1.

24. An interaction safety control method between an elevator system and a machine passenger, comprising:

receiving a command from the machine passenger;

based on a received command, determining the safety of the command with respect to the elevator system; and in case that the command is determined to be unsafe with respect to the elevator system, not sending the command to an elevator control device of the elevator system;

wherein information of the command comprises a command type, an identifier of the machine passenger sending the command, and a receipt time;

the determining the safety of the command with respect to the elevator system comprise:

based on the receipt time of commands from a same machine passenger, determining adjacent receipt time intervals of the commands of a same command type from the same machine passenger; and based on a determined adjacent receipt time interval, determining the safety of the command with respect to the elevator system;

wherein in response to the command being determined unsafe, preventing the received command from being sent to an elevator control device thereby preventing operation of the elevator system in response to the received command.

25. The interaction safety control method of claim 24, wherein in the process of determining the safety of the command with respect to the elevator system, if the adjacent receipt time interval of the currently received commands is smaller than a safe time interval corresponding to the command type of the command, determining that the currently received command is unsafe with respect to the elevator system.

26. The interaction safety control method of claim 25, wherein the safe time interval is preset respectively according to a minimum time required by the commands of a respective command type to be normally executed once by the elevator system.

27. An interaction safety control method between an elevator system and a machine passenger, comprising:

receiving a command from the machine passenger;

based on a received command, determining the safety of the command with respect to the elevator system; and in case that the command is determined to be unsafe with respect to the elevator system, not sending the command to an elevator control device of the elevator system;

wherein information of the command comprises a command type, an identifier of the machine passenger sending the command, and a receipt time;

the determining the safety of the command with respect to the elevator system comprise:

if a first command and a second command received in sequence from a same machine passenger have different command types from each other and the first command has been sent to the elevator control device, judging whether command permutations and combinations containing the first command and the second command conform to control logic of the elevator system for the same passenger;

if the command permutations and combinations do not conform to the control logic, determining that a received second command is unsafe with respect to the elevator system and preventing the received command from being sent to an elevator control device thereby preventing operation of the elevator system in response to the received command.

28. The interaction safety control method of claim 27, wherein in the process of determining the safety of the command with respect to the elevator system:

according to the receipt time of a currently received second command, determining a predetermined time period by subtracting a respective predetermined time period from the receipt time, wherein the predetermined time period is related to the command type of the second command;

determining the first command from the same machine passenger contained within the predetermined time period which has been received and sent to the elevator control device, and forming the command permutations and combinations that contain the first command and the second command formed in a sequential order of the receipt time.

* * * * *